United States Patent
Kennedy et al.

(10) Patent No.: US 6,786,210 B2
(45) Date of Patent: Sep. 7, 2004

(54) WORKING FLUID CIRCUIT FOR A TURBOCHARGED ENGINE HAVING EXHAUST GAS RECIRCULATION

(75) Inventors: Lawrence C. Kennedy, Bingham Farms, MI (US); Edward F. Crawford, Dexter, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 10/177,216

(22) Filed: Jun. 21, 2002

(65) Prior Publication Data

US 2003/0234009 A1 Dec. 25, 2003

(51) Int. Cl.$^7$ .................... F02M 25/07; F02B 29/04
(52) U.S. Cl. .................. 123/568.12; 60/599; 60/605.2; 123/568.16
(58) Field of Search ................. 123/568.11, 568.12, 123/568.16, 568.17, 568.18, 568.21, 568.22, 563; 60/605.2, 599

(56) References Cited

U.S. PATENT DOCUMENTS

| | | | |
|---|---|---|---|
| 3,996,748 A | | 12/1976 | Melchior ................. 60/614 |
| 4,179,892 A | * | 12/1979 | Heydrich ................ 60/605.2 |
| 5,517,976 A | * | 5/1996 | Bachle et al. ........... 123/568.12 |
| 5,607,010 A | | 3/1997 | Schonfeld et al. .......... 165/51 |
| 5,611,204 A | | 3/1997 | Radovanovic et al. ..... 60/605.2 |
| 5,617,726 A | * | 4/1997 | Sheridan et al. .......... 60/605.2 |
| 5,657,630 A | * | 8/1997 | Kjemtrup et al. .......... 60/605.2 |
| 6,116,026 A | | 9/2000 | Freese, V ................ 60/605.2 |
| 6,216,458 B1 | | 4/2001 | Alger et al. .............. 60/605.2 |
| 6,230,695 B1 | * | 5/2001 | Coleman et al. ......... 123/568.12 |
| 6,267,106 B1 | | 7/2001 | Feucht .................. 123/568.17 |
| 6,305,167 B1 | | 10/2001 | Weisman, II et al. ......... 60/602 |
| 6,324,846 B1 | * | 12/2001 | Clarke .................... 60/605.2 |
| 6,367,256 B1 | * | 4/2002 | McKee .................... 60/605.2 |
| 6,513,484 B1 | * | 2/2003 | Buckland et al. ........ 123/568.12 |
| 2003/0150434 A1 | * | 8/2003 | Leedham et al. ........ 123/568.12 |

FOREIGN PATENT DOCUMENTS

| | | |
|---|---|---|
| EP | 0 656 467 A1 | 6/1995 |
| JP | 62046194 | 2/1987 |
| JP | 7034983 | 2/1995 |
| JP | 7071329 | 3/1995 |
| JP | 9256915 | 9/1997 |

\* cited by examiner

*Primary Examiner*—Willis R. Wolfe
(74) *Attorney, Agent, or Firm*—Bliss McGlynn, P.C.

(57) ABSTRACT

The working fluid circuit of the present invention includes an exhaust gas passage through which exhaust gas under pressure flows from the internal combustion engine, a charge air passage, and a turbocharger. An exhaust gas recirculation passage extends between the exhaust gas passage and the charge air passage, but bypasses the turbocharger and provides a path for recirculating a predetermined amount of exhaust gas into the charge air passage in such a way that the exhaust gas and the charge air are mixed together. An intake passage provides intake air to the internal combustion engine. A single charge air cooler is operatively interconnected to and provides fluid communication between the charge air passage and the intake passage and acts to cool the mixed charge air and the recirculated exhaust gas prior to induction into the internal combustion engine through the intake passage.

5 Claims, 7 Drawing Sheets

FIGURE 3A

CROSS-FLOW CHARGE AIR COOLER ANALYSIS, Combined EGR and Charge Air Cooler

"Bold" type indicates input is required

| Description | Symbol | Units | Ram-air Cold Side Mod. | Charge-air Hot Side Mod. | Composite Cooler Mod. |
|---|---|---|---|---|---|
| Surface: | | | 1/8 - 15.61 | 1/4(s)-11.1 | |
| Ref: "Compact heat Exchangers", Kays & London | | | Fig. 10-55 | Fig. 10-52 | |
| Type: | | | Strip-fin plate-fin | Strip-fin plate-fin | |
| Side | | | 1 | 2 | |
| Scaling factor, "Std".-to-"Mod" | | | 1.68 | 1.18 | |
| Fin pitch | $P_f$ | $mm^{-1}$ | 0.365814 | 0.370346 | |
| Plate Spacing | b | mm | 10.668 | 7.493 | |
| | | m | 0.01067 | 0.00749 | |
| Flow passage hyd dia. | $4r_h$ | m | 0.004137 | 0.003722 | |
| Fin metal thickness | $\delta$ | mm | 0.1016 | 0.1270 | |
| Fin material | | | 304 SS | 304 SS | |
| Fin Heat Transfer coefficient | $k_f$ | W/m-°K | 21 | 21 | |
| Total ht trans area/Vol bet plates | $\beta$ | $m^2/m^3$ | 921.43 | 1020.34 | |
| Fin area/Total area | $A_f/A$ | | 0.809 | 0.756 | |
| Fin length (in flow direction) | | mm | 5.334 | 7.493 | |
| Cooler core dimensions: | | | | | |
| Wall thickness | a | mm | | | 0.127 |
| Wall material | | | | | 304 SS |
| Wall Heat Transfer coefficient | $k_w$ | W/m-°K | | | 21 |
| Flow length | L | m | 0.05715 | 0.93980 | |
| Number in stack | N | | 51 | 50 | |
| Total Stack Ht, $(Nb)_1+(Nb)_2+(N_1+N_2)a$ | H | m | | | 0.9315 |
| Cooler Volume, $HL_1L_2$ | V | $m^3$ | | | 0.05003 |
| Frontal area, $HL_2$; $HL_1$ | $A_{fr}$ | $m^2$ | 0.8755 | 0.0532 | |
| Unit transfer area (one side), $\beta b_1 L_1 L_2$; $\beta_2 b_2 L_1 L_2$ | A/N | $m^2$ | 0.5280 | 0.4106 | |
| Unit Free-flow area, $\beta b_1 L_2 r_{h,1}$; $\beta_2 b_2 L_1 r_{h,2}$ | $A_c/N$ | $m^2$ | 0.00955 | 0.00041 | |
| Unit Fin area, $\beta b_1 L_1 L_2 (A_{f,1}/A_1)$; $\beta_2 b_2 L_1 L_2 (A_{f,2}/A_2)$ | $A_f/N$ | $m^2$ | 0.4271 | 0.3104 | |
| Transfer area (one side)/exchanger volume, $b_1 \beta_1/(b_1+b_2+2a)$; $b_2\beta_2/(b_1+b_2+2a)$ | $\alpha$ | $m^2/m^3$ | 533.79 | 415.17 | |
| Total transfer area (one side), (A/N)N | A | $m^2$ | 26.9257 | 20.5316 | |
| Free-flow area, $(A_c/N)N$ | $A_c$ | $m^2$ | 0.48728 | 0.02033 | |
| Free-flow area/frontal area, $A_c/A_{fr}$ | $\sigma$ | | 0.55659 | 0.38184 | |
| Unit Fin frontal area, $b_1 L_2 - A_{c,1}/N_1$; $b_2 L_1 - A_{c,2}/N_2$ | $A_{fns}$ | $m^2$ | 0.00047 | 0.00002 | |
| Unit Fin developed length, $A_{fd}/\delta$ | $l_{fd}$ | m | 4.636738 | 0.170774 | |
| New hyd dia for new $\delta$, $4(b_1 L_2 - \delta_1 l_{fd,1})/\beta_1 b_1 L_2$ | $4r_{h,1}$ | m | 0.004137 | | |
| $4(b_2 L_1 - \delta_2 l_{fd,2})/\beta_2 b_2 L_1$ | $4r_{h,2}$ | m | | 0.003722 | |
| Fluid Properties: | | | | | |
| Temperature In | $T_i$ | °C | 35 | 312 | |
| Temperature Out (estimated) | $T_o$ | °C | 62 | 80 | |
| Temperature average, $(T_i + T_o)/2$ | $T_{av}$ | °C | 48 | 196 | |
| Pressure In | $P_i$ | kPa | 101.35 | 332.33 | |
| Pressure Out (estimated) | $P_o$ | kPa | 94.46 | 318.54 | |
| Viscosity coefficient @ $T_{av}$ | $\mu$ | Pa-s | 1.9553E-05 | 2.5795E-05 | |
| Prandle Number @ $T_{av}$ | Pr | | 0.708 | 0.700 | |
| Specific Heat @ $T_{av}$ | $c_p$ | kJ/kg-°K | 1.004 | 1.024 | |
| Specific Volume In, $RT_i/P_i$ | $\upsilon_i$ | $m^3/kg$ | 0.8728 | 0.5055 | |
| Specific Volume Out, $RT_o/P_o$ | $\upsilon_o$ | $m^3/kg$ | 1.0176 | 0.3183 | |
| Specific Volume average | $\upsilon_{av}$ | $m^3/kg$ | 0.9452 | 0.4119 | |

FIGURE 3B

CROSS-FLOW CHARGE AIR COOLER ANALYSIS, Combined EGR and Charge Air Cooler

"Bold" type indicates input is required

| Description | Symbol | Units | Ram-air Cold Side Mod. | Charge-air Hot Side Mod. | Composite Cooler Mod. |
|---|---|---|---|---|---|
| Gas Entrance Velocity, $W_b/A_{fr}$ | u | m/s | 6.096 | 6.456 | |
| Mass flow rate, $uA_{fr}/v_i$ | W | kg/min | 367 | 40.8 | |
| Mass velocity, $W/A_c$ | G | kg/h-m² | 45174 | 120423 | |
| Reynolds Number, $4r_hG/\mu$ | Re | | 2655 | 4827 | |
| From Figures 10-55 and 10-52 $StPr^{2/3}$ | $StPr^{2/3}$ | | 0.0100 | 0.0063 | |
| and Friction factor | f | | 0.0390 | 0.0220 | |
| Stanton number, | St | | 0.01259 | 0.00799 | |
| Heat Transfer Coefficient, $StGc_p$ | h | W/m²-°K | 158.60 | 273.73 | |
| Fin Effectiveness: | | | | | |
| Fin effectiveness parameter, $(2h/(k\delta))^{1/2}$ | m | m⁻¹ | 385.6 | 453.1 | |
| Effect fin length, b/2 | l | m | 0.00533 | 0.00375 | |
| Fin surface effectiveness, tanh ml/ml | $\eta_f$ | | 0.471 | 0.551 | |
| Overall Surface effectiveness, $1-(A_f/A)(1-\eta_f)$ | $\eta_o$ | | 0.572 | 0.660 | |
| Overall Coefficient of Heat Transfer, | | | | | |
| $1/(1/\eta_{o,1}h_1 + a/(A_w/A_1)k_w + 1/(A_2/A_1)\eta_{o,2}h_2)$ | $U_1$ | W/m²-°K | 54.60 | | |
| $1/(1/\eta_{o,2}h_2 + a/(A_w/A_2)k_w + 1/(A_1/A_2)\eta_{o,1}h_1)$ | $U_2$ | W/m²-°K | | 71.60 | |
| $N_{tu}$ and Exchanger Effectiveness: | | | | | |
| Capacity rate, $Wc_p$ | C | W/°K | 6139 | 696 | |
| Capacity-rate ratio, $C_{min}/C_{max}$ | $C_{min}/C_{max}$ | | | | 0.113 |
| Fouling Factor | F | | | | 0.95 |
| Number of heat transfer units, $FAU/C_{min}$ | $N_{tu,max}$ | | | | 2.01 |
| Effectiveness, from Figure 2-16 | $\varepsilon$ | | | | 0.84 |
| Outlet Temperature, $T_{i,2}-\varepsilon(C_{min}/C_2)(T_{i,2}-T_{i,1})$ | $T_{o,2}$ | °C | | 79.3 | |
| $T_{i,1}+\varepsilon(C_{min}/C_1)(T_{i,2}-T_{i,1})$ | $T_{o,1}$ | °C | 61.4 | | |
| Heat Transfer, $C_2(T_{i,2}-T_{o,2})$ | q | W | | | 162020 |
| Pressure Drops: | | | | | |
| From Figure 5-4, Entrance Pressure loss | $K_c$ | | 0.44 | 0.48 | |
| Exit Pressure loss | $K_e$ | | 0.10 | 0.33 | |
| Entrance effect, $K_c + 1 - \sigma^2$ | entr | | 1.1302 | 1.3342 | |
| Flow acceleration, $2((v_o/v_i) - 1)$ | accel | | 0.3318 | -0.7407 | |
| Core friction, $f(A/A_c)(v_{av}/v_i)$ | fcore | | 2.3338 | 18.1053 | |
| Exit effect, $(1 - \sigma^2 - K_e)(v_o/v_i)$ | exit | | 0.6881 | 0.3301 | |
| Total effects, entr + accel + fcore - exit | total | | 3.1077 | 18.3687 | |
| Dyn/Static heads, $G^2v_i/2g_cP_i$ | Dyn/Sta | | 0.0007 | 0.0009 | |
| $G^2v_i/2g_cP_i[(K_c + 1 - \sigma^2) + 2((v_o/v_i) - 1)$ | | | | | |
| $+ f(A/A_c)(v_{av}/v_i) - (1 - \sigma^2 - K_e)(v_o/v_i)]$ | $\Delta P/P_i$ | | 0.00211 | 0.01563 | |
| | $\Delta P$ | kPa | 0.2136 | 5.1945 | |
| Pressure Out | $P_o$ | kPa | 101.14 | 327.14 | |
| Core Weight Estimate: | | | | | |
| Fin developed length, measured layout | $l_d$ | mm | 12.0604 | 8.5864 | |
| Fin volume, $l_{d,1}P_{f,1}L_1L_2\delta_1N_1$; $l_{d,2}P_{f,2}L_1L_2\delta_2N_2$ | $V_f$ | mm³ | 1227826 | 1084534 | |
| Tube volume, $(2L_1 + 3b_2)L_2N_2a$ | $V_t$ | mm³ | | 816260 | |
| End-plate volume, $2(L_1 + 12.7)(H + 12.7)0.8128$ | $V_{ep}$ | mm³ | | | 107217 |
| Total Core volume | $V_c$ | mm³ | | | 3235837 |
| Core Weight, $w_{sp}V_c$ | Wt | kg | | | 25.97 |

FIGURE 4A

CROSS-FLOW CHARGE AIR COOLER ANALYSIS, Supplier G's Charge Cooler

"Bold" type indicates input is required

| Description | Symbol | Units | Ram-air Cold Side Mod. | Charge-air Hot Side Mod. | Composite Cooler Mod. |
|---|---|---|---|---|---|
| Surface: | | | 1/8 - 15.61 | 11.11 | |
| Ref: "Compact heat Exchangers", Kays & London | | | Fig. 10-55 | Fig. 10-26 | |
| Type: | | | Strip-fin plate-fin | Plain plate-fin | |
| Side | | | 1 | 2 | |
| Scaling factor, "Std."-to-"Mod" | | | 2.00 | 1.50 | |
| Fin pitch | $P_f$ | $mm^{-1}$ | 0.307284 | 0.291339 | |
| Plate Spacing | b | mm | 12.700 | 9.525 | |
| | | m | 0.01270 | 0.00953 | |
| Flow passage hyd dia. | $4r_h$ | m | 0.004760 | 0.004662 | |
| Fin metal thickness | $\delta$ | mm | 0.2032 | 0.2032 | |
| Fin material | | | Alum | Alum | |
| Fin Heat Transfer coefficient | $k_f$ | W/m-°K | 173 | 173 | |
| Total ht trans area/Vol bet plates | $\beta$ | $m^2/m^3$ | 774.00 | 802.87 | |
| Fin area/Total area | $A_f/A$ | | 0.809 | 0.756 | |
| Fin length (in flow direction) | | mm | 6.35 | NA | |
| Cooler core dimensions: | | | | | |
| Wall thickness | a | mm | | | 0.305 |
| Wall material | | | | | Alum |
| Wall Heat Transfer coefficient | $k_w$ | W/m-°K | | | 173 |
| Flow length | L | m | 0.05715 | 0.93980 | |
| Number in stack | N | | 30 | 29 | |
| Total Stack Ht, $(Nb)_1+(Nb)_2+(N_1+N_2)a$ | H | m | | | 0.6752 |
| Cooler Volume, $HL_1L_2$ | V | $m^3$ | | | 0.03627 |
| Frontal area, $HL_2$; $HL_1$ | $A_{fr}$ | $m^2$ | 0.6346 | 0.0386 | |
| Unit transfer area (one side), $\beta_1 b_1 L_1 L_2$; $\beta_2 b_2 L_1 L_2$ | A/N | $m^2$ | 0.5280 | 0.4106 | |
| Unit Free-flow area, $\beta_1 b_1 L_2 r_{h,1}$; $\beta_2 b_2 L_1 r_{h,2}$ | $A_c$/N | $m^2$ | 0.01099 | 0.00051 | |
| Unit Fin area, $\beta_1 b_1 L_1 L_2 (A_{f,1}/A_1)$; $\beta_2 b_2 L_1 L_2 (A_{f,2}/A_2)$ | $A_f$/N | $m^2$ | 0.4271 | 0.3104 | |
| Transfer area (one side)/exchanger volume, $b_1 \beta_1/(b_1+b_2+2a)$; $b_2 \beta_2/(b_1+b_2+2a)$ | $\alpha$ | $m^2/m^3$ | 430.48 | 334.82 | |
| Total transfer area (one side), (A/N)N | A | $m^2$ | 15.8386 | 11.9083 | |
| Free-flow area, $(A_c/N)N$ | $A_c$ | $m^2$ | 0.32980 | 0.01477 | |
| Free-flow area/frontal area, $A_c/A_{fr}$ | $\sigma$ | | 0.51973 | 0.38271 | |
| Unit Fin frontal area, $b_1 L_2 - A_{c,1}/N_1$; $b_2 L_1 - A_{c,2}/N_2$ | $A_{fxs}$ | $m^2$ | 0.00094 | 0.00004 | |
| Unit Fin developed length, $A_{xs}/\delta$ | $l_{fd}$ | m | 4.636738 | 0.172924 | |
| New hyd dia for new $\delta$, $4(b_1 L_2 - \delta_1 l_{fd,1})/\beta_1 b_1 L_2$ | $4r_{h,1}$ | m | 0.004760 | | |
| $4(b_2 L_1 - \delta_2 l_{fd,2})/\beta_2 b_2 L_1$ | $4r_{h,2}$ | m | | 0.004662 | |
| Fluid Properties: | | | | | |
| Temperature In | $T_i$ | °C | 35 | 251 | |
| Temperature Out (estimated) | $T_o$ | °C | 62 | 80 | |
| Temperature average, $(T_i + T_o)/2$ | $T_{av}$ | °C | 49 | 166 | |
| Pressure In | $P_i$ | kPa | 101.35 | 332.33 | |
| Pressure Out (estimated) | $P_o$ | kPa | 94.46 | 318.54 | |
| Viscosity coefficient @ $T_{av}$ | $\mu$ | Pa-s | 1.9553E-05 | 2.4927E-05 | |
| Prandle Number @ $T_{av}$ | Pr | | 0.708 | 0.700 | |
| Specific Heat @ $T_{av}$ | $c_p$ | kJ/kg-°K | 1.004 | 1.029 | |
| Specific Volume In, $RT_i/P_i$ | $\upsilon_i$ | $m^3$/kg | 0.8728 | 0.4528 | |
| Specific Volume Out, $RT_o/P_o$ | $\upsilon_o$ | $m^3$/kg | 1.0185 | 0.3183 | |
| Specific Volume average | $\upsilon_{av}$ | $m^3$/kg | 0.9457 | 0.3855 | |

FIGURE 4B

CROSS-FLOW CHARGE AIR COOLER ANALYSIS, Supplier G's Charge Cooler

| Description | Symbol | Units | Ram-air Cold Side Mod. | Charge-air Hot Side Mod. | Composite Cooler Mod. |
|---|---|---|---|---|---|
| "Bold" type indicates input is required | | | | | |
| Gas Entrance Velocity, $W_i/A_f$ | u | m/s | 6.096 | 6.844 | |
| Mass flow rate, $uA_f/v_i$ | W | kg/min | 266 | 35 | |
| Mass velocity, $W/A_c$ | G | kg/h-m² | 48378 | 142198 | |
| Reynolds Number, $4r_hG/\mu$ | Re | | 3271 | 7387 | |
| From Figures 10-55 and 10-26 $StPr^{2/3}$ | $StPr^{2/3}$ | | 0.0093 | 0.0034 | |
| and Friction factor | f | | 0.0375 | 0.0094 | |
| Stanton number, | St | | 0.01171 | 0.00431 | |
| Heat Transfer Coefficient, $StGc_p$ | h | W/m²-°K | 157.96 | 175.29 | |
| Fin Effectiveness: | | | | | |
| Fin effectiveness parameter, $(2h/(k_f\delta))^{1/2}$ | m | m⁻¹ | 94.799 | 99.863 | |
| Effect fin length, b/2 | l | m | 0.00635 | 0.00476 | |
| Fin surface effectiveness, tanh ml/ml | $\eta_f$ | | 0.894 | 0.931 | |
| Overall Surface effectiveness, $1-(A_f/A)(1-\eta_f)$ | $\eta_o$ | | 0.915 | 0.948 | |
| Overall Coefficient of Heat Transfer, | | | | | |
| $1/(1/\eta_{o,1}h_1 + a/(A_w/A_1)k_w + 1/(A_2/A_1)\eta_{o,2}h_2)$ | $U_1$ | W/m²-°K | 66.95 | | |
| $1/(1/\eta_{o,2}h_2 + a/(A_w/A_2)k_w + 1/(A_1/A_2)\eta_{o,1}h_1)$ | $U_2$ | W/m²-°K | | 89.04 | |
| $N_{tu}$ and Exchanger Effectiveness: | | | | | |
| Capacity rate, $Wc_p$ | C | W/°K | 4450 | 600 | |
| Capacity-rate ratio, $C_{min}/C_{max}$ | $C_{min}/C_{max}$ | | | | 0.135 |
| Fouling Factor | F | | | | 1.00 |
| Number of heat transfer units, $FAU/C_{min}$ | $N_{tu,max}$ | | | | 1.77 |
| Effectiveness, from Figure 2-16 | $\epsilon$ | | | | 0.79 |
| Outlet Temperature, $T_{i,2} - \epsilon(C_{min}/C_2)(T_{i,2} - T_{i,1})$ | $T_{o,2}$ | °C | | 80.4 | |
| $T_{i,1} + \epsilon(C_{min}/C_1)(T_{i,2} - T_{i,1})$ | $T_{o,1}$ | °C | 58.0 | | |
| Heat Transfer, $C_2(T_{i,2} - T_{o,2})$ | q | W | | | 102427 |
| Pressure Drops: | | | | | |
| From Figure 5-4, Entrance Pressure loss | $K_c$ | | 0.44 | 0.48 | |
| Exit Pressure loss | $K_e$ | | 0.14 | 0.33 | |
| Entrance effect, $K_c + 1 - \sigma^2$ | entr | | 1.1699 | 1.3285 | |
| Flow acceleration, $2((v_o/v_i) - 1)$ | accel | | 0.3339 | -0.5941 | |
| Core friction, $f(A/A_c)(v_m/v_i)$ | fcore | | 1.9513 | 6.4538 | |
| Exit effect, $(1 - \sigma^2 - K_e)(v_o/v_i)$ | exit | | 0.6884 | 0.3680 | |
| Total effects, entr + accel + fcore - exit | total | | 2.7667 | 6.8202 | |
| Dyn/Static heads, $G^2v_i/2g_cP_i$ | Dyn/Sta | | 0.0008 | 0.0011 | |
| $G^2v_i/2g_cP_i[(K_c + 1 - \sigma^2) + 2((v_o/v_i) - 1)$ | | | | | |
| $+ f(A/A_c)(v_m/v_i) - (1 - \sigma^2 - K_e)(v_o/v_i)]$ | $\Delta P/P_i$ | | 0.00215 | 0.00725 | |
| | $\Delta P$ | kPa | 0.2180 | 2.4089 | |
| Pressure Out | $P_o$ | kPa | 101.13 | 329.92 | |
| Core Weight Estimate: | | | | | |
| Fin developed length, measured layout | $l_d$ | mm | 14.3576 | 10.9149 | |
| Fin volume, $l_{d,1}P_{t,1}L_1L_2\delta_1N_1; l_{d,2}P_{t,2}L_1L_2\delta_2N_2$ | $V_f$ | mm³ | 1444501 | 1006448 | |
| Tube volume, $(2L_1 + 3b_2)L_2N_2a$ | $V_t$ | mm³ | | 1186874 | |
| End-plate volume, $2(L_1 + 12.7)(H + 12.7)0..8128$ | $V_{ep}$ | mm³ | | | 78111 |
| Total Core volume | $V_c$ | mm³ | | | 3715933 |
| Core Weight, $w_{sp}V_c$ | Wt | kg | | | 10.08 |

FIGURE 5A

CROSS-FLOW CHARGE AIR COOLER ANALYSIS, Supplier B's Charge Cooler

"Bold" type indicates input is required

| Description | Symbol | Units | Ram-air Cold Side Mod. | Charge-air Hot Side Mod. | Composite Cooler Mod. |
|---|---|---|---|---|---|
| Surface: | | | 1/8 - 15.61 | 11.11 | |
| Ref: "Compact heat Exchangers", Kays & London | | | Fig. 10-55 | Fig. 10-26 | |
| Type: | | | Strip-fin plate-fin | Plain plate-fin | |
| Side | | | 1 | 2 | |
| Scaling factor, "Std".-to-"Mod" | | | 1.89 | 1.10 | |
| Fin pitch | $P_f$ | mm$^{-1}$ | 0.325168 | 0.396559 | |
| Plate Spacing | b | mm | 12.002 | 6.998 | |
| | | m | 0.01200 | 0.00700 | |
| Flow passage hyd dia. | $4r_h$ | m | 0.004498 | 0.003500 | |
| Fin metal thickness | $\delta$ | mm | 0.1920 | 0.1016 | |
| Fin material | | | Alum | Alum | |
| Fin Heat Transfer coefficient | $k_f$ | W/m-°K | 173 | 173 | |
| Total ht trans area/Vol bet plates | $\beta$ | m$^2$/m$^3$ | 819.05 | 1092.56 | |
| Fin area/Total area | $A_f/A$ | | 0.809 | 0.756 | |
| Fin length (in fllow direction) | | mm | 6.001 | NA | |
| Cooler core dimensions: | | | | | |
| Wall thickness | a | mm | | | 0.4572 |
| Wall material | | | | | Alum |
| Wall Heat Transfer coefficient | $k_w$ | W/m-°K | | | 173 |
| Flow length | L | m | 0.0508 | 0.9398 | |
| Number in stack | N | | 34 | 33 | |
| Total Stack Ht, $(Nb)_1+(Nb)_2+(N_1+N_2)a$ | H | m | | | 0.6696 |
| Cooler Volume, $HL_1L_2$ | V | m$^3$ | | | 0.03197 |
| Frontal area, $HL_2$; $HL_1$ | $A_{fr}$ | m$^2$ | 0.6293 | 0.0340 | |
| Unit transfer area (one side), $\beta b_1 L_1 L_2$; $\beta_2 b_2 L_1 L_2$ | A/N | m$^2$ | 0.4693 | 0.3650 | |
| Unit Free-flow area, $\beta b_1 L_2 r_{h,1}$; $\beta_2 b_2 L_1 r_{h,2}$ | $A_c$/N | m$^2$ | 0.01039 | 0.00034 | |
| Unit Fin area, $\beta_1 b_1 L_1 L_2 (A_{f,1}/A_1)$; $\beta_2 b_2 L_1 L_2 (A_{f,2}/A_2)$ | $A_f$/N | m$^2$ | 0.3797 | 0.2759 | |
| Transfer area (one side)/exchanger volume, $b_1\beta_1/(b_1+b_2+2a)$; $b_2\beta_2/(b_1+b_2+2a)$ | $\alpha$ | m$^2$/m$^3$ | 493.62 | 383.93 | |
| Total transfer area (one side), (A/N)N | A | m$^2$ | 15.9560 | 12.0452 | |
| Free-flow area, $(A_c/N)N$ | $A_c$ | m$^2$ | 0.35321 | 0.01121 | |
| Free-flow area/frontal area, $A_c/A_{fr}$ | $\sigma$ | | 0.56128 | 0.32969 | |
| Unit Fin frontal area, $b_1 L_2 - A_{c,1}/N_1$; $b_2 L_1 - A_{c,2}/N_2$ | $A_{fs}$ | m$^2$ | 0.00089 | 0.00002 | |
| Unit Fin developed length, $A_{fs}/\delta$ | $l_d$ | m | 4.636738 | 0.153710 | |
| New hyd dia for new $\delta$, $4(b_1 L_2 - \delta_1 l_{d,1})/\beta_1 b_1 L_2$ | $4r_{h,1}$ | m | 0.004498 | | |
| $4(b_2 L_1 - \delta_2 l_{d,2})/\beta_2 b_2 L_1$ | $4r_{h,2}$ | m | | 0.003500 | |
| Fluid Properties: | | | | | |
| Temperature In | $T_i$ | °C | 35 | 251 | |
| Temperature Out (estimated) | $T_o$ | °C | 62 | 80 | |
| Temperature average, $(T_i + T_o)/2$ | $T_{av}$ | °C | 49 | 166 | |
| Pressure In | $P_i$ | kPa | 101.35 | 332.33 | |
| Pressure Out (estimated) | $P_o$ | kPa | 94.46 | 318.54 | |
| Viscosity coefficient @ $T_{av}$ | $\mu$ | Pa-s | 1.9553E-05 | 2.4927E-05 | |
| Prandle Number @ $T_{av}$ | Pr | | 0.708 | 0.700 | |
| Specific Heat @ $T_{av}$ | $c_p$ | kJ/kg-°K | 1.004 | 1.029 | |
| Specific Volume In | $\upsilon_i$ | m$^3$/kg | 0.8728 | 0.4528 | |
| Specific Volume Out | $\upsilon_o$ | m$^3$/kg | 1.0185 | 0.3183 | |
| Specific Volume average | $\upsilon_{av}$ | m$^3$/kg | 0.9457 | 0.3855 | |

FIGURE 5B

CROSS-FLOW CHARGE AIR COOLER ANALYSIS, Supplier B's Charge Cooler

"Bold" type indicates input is required

| Description | Symbol | Units | Ram-air Cold Side Mod. | Charge-air Hot Side Mod. | Composite Cooler Mod. |
|---|---|---|---|---|---|
| Gas Entrance Velocity, $W_i/A_{fr}$ | u | m/s | 6.096 | 7.764 | |
| Mass flow rate, $uA_{fr}/v_i$ | W | kg/min | 264 | 35 | |
| Mass velocity, $W/A_c$ | G | kg/h-m² | 44797 | 187255 | |
| Reynolds Number, $4r_hG/\mu$ | Re | | 2863 | 7303 | |
| From Figures 10-55 and 10-26 $StPr^{2/3}$ | $StPr^{2/3}$ | | 0.0098 | 0.0034 | |
| and Friction factor | f | | 0.0380 | 0.0094 | |
| Stanton number, | St | | 0.01234 | 0.00431 | |
| Heat Transfer Coefficient, $StGc_p$ | h | W/m²-°K | 154.13 | 230.83 | |
| Fin Effectiveness: | | | | | |
| Fin effectiveness parameter, $(2h/(k_f\delta))^{1/2}$ | m | m⁻¹ | 96.328 | 162.066 | |
| Effect fin length, b/2 | l | m | 0.00600 | 0.00350 | |
| Fin surface effectiveness, tanh ml/ml | $\eta_f$ | | 0.902 | 0.905 | |
| Overall Surface effectiveness, $1-(A_f/A)(1-\eta_f)$ | $\eta_o$ | | 0.921 | 0.928 | |
| Overall Coefficient of Heat Transfer, | | | | | |
| $1/(1/\eta_{o,1}h_1 + a/(A_w/A_1)k_w + 1/(A_2/A_1)\eta_{o,2}h_2)$ | $U_1$ | W/m²-°K | 75.50 | | |
| $1/(1/\eta_{o,2}h_2 + a/(A_w/A_2)k_w + 1/(A_1/A_2)\eta_{o,1}h_1)$ | $U_2$ | W/m²-°K | | 100.01 | |
| $N_{tu}$ and Exchanger Effectiveness: | | | | | |
| Capacity rate, $Wc_p$ | C | W/°K | 4413 | 600 | |
| Capacity-rate ratio, $C_{min}/C_{max}$ | $C_{min}/C_{max}$ | | | | 0.136 |
| Fouling Factor | F | | | | 1.00 |
| Number of heat transfer units, $FAU/C_{min}$ | $N_{tu,max}$ | | | | 2.01 |
| Effectiveness, from Figure 2-16 | ε | | | | 0.81 |
| Outlet Temperature, $T_{i,2} - \varepsilon(C_{min}/C_2)(T_{i,2} - T_{i,1})$ | $T_{o,2}$ | °C | | 76.0 | |
| $T_{i,1} + \varepsilon(C_{min}/C_1)(T_{i,2} - T_{i,1})$ | $T_{o,1}$ | °C | 58.8 | | |
| Heat Transfer, $C_2(T_{i,2} - T_{o,2})$ | q | W | | | 105020 |
| Pressure Drops: | | | | | |
| From Figure 5-4, Entrance Pressure loss | $K_c$ | | 0.44 | 0.48 | |
| Exit Pressure loss | $K_e$ | | 0.11 | 0.40 | |
| Entrance effect, $K_c + 1 - \sigma^2$ | entr | | 1.1250 | 1.3663 | |
| Flow acceleration, $2((v_o/v_i) - 1)$ | accel | | 0.3339 | -0.5941 | |
| Core friction, $f(A/A_c)(v_{av}/v_i)$ | fcore | | 1.8599 | 8.5965 | |
| Exit effect, $(1 - \sigma^2 - K_e)(v_o/v_i)$ | exit | | 0.6710 | 0.3454 | |
| Total effects, entr + accel + fcore - exit | total | | 2.6478 | 9.0233 | |
| Dyn/Static heads, $G^2v_i/2g_cP_i$ | Dyn/Sta | | 0.0007 | 0.0018 | |
| $G^2v_i/2g_cP_i[(K_c + 1 - \sigma^2) + 2((v_o/v_i) - 1)$ | | | | | |
| $+ f(A/A_c)(v_{av}/v_i) - (1 - \sigma^2 - K_e)(v_o/v_i)]$ | $\Delta P/P_i$ | | 0.00177 | 0.01663 | |
| | $\Delta P$ | kPa | 0.1789 | 5.5267 | |
| Pressure Out | $P_o$ | kPa | 101.17 | 326.80 | |
| Core Weight Estimate: | | | | | |
| Fin developed length, measured layout | $l_{fd}$ | mm | 13.5679 | 8.0188 | |
| Fin volume, $l_{fd,1}P_{f,1}L_1L_2\delta_1N_1$; $l_{fd,2}P_{f,2}L_1L_2\delta_2N_2$ | $V_f$ | mm³ | 1375165 | 509008 | |
| Tube volume, $(2L_t + 3b_2)L_2N_2a$ | $V_t$ | mm³ | | 1738288 | |
| End-plate volume, $2(L_t + 12.7)(H + 12.7)0.8128$ | $V_{ep}$ | mm³ | | | 70432 |
| Total Core volume | $V_c$ | mm³ | | | 3692892 |
| Core Weight, $w_{sp}V_c$ | Wt | kg | | | 10.02 |

WORKING FLUID CIRCUIT FOR A TURBOCHARGED ENGINE HAVING EXHAUST GAS RECIRCULATION

BACKGROUND OF THE INVENTION

1. Field of the Invention

The invention relates, generally, to a working fluid circuit for an internal combustion engine, and more specifically, to a fluid circuit for a turbocharged internal combustion engine that employs exhaust gas recirculation.

2. Description of the Related Art

Exhaust gas recirculation is commonly employed in connection with internal combustion engines as a means for controlling the generation of oxides of Nitrogen ($NO_x$) generated during the operation of the engine. This involves the recirculation of exhaust gas byproducts, typically taken from the exhaust manifold, and routed into the intake air supply of the engine. The exhaust gas reintroduced into the engine cylinder in this way reduces the concentration of oxygen in the fuel/air mixture. A reduction of oxygen in the fuel/air mixture results in a lower maximum combustion temperature and slows the chemical reaction of the combustion process. This decreases the formation of nitrous oxides ($NO_x$) that are discharged from the engine. In addition, the exhaust gases often contain a portion of unburned hydrocarbon that, left uncombusted, forms a part of the exhaust emissions generated during the operation of any given internal combustion engine. However, when the unburned hydrocarbons are recirculated back to the combustion chamber, they are burned thereby further reducing the emission of undesirable exhaust gas byproducts from the engine. In view of the benefits derived by employing this technique, exhaust gas recirculation is commonly found in connection with both spark ignition and compression ignition (diesel) engines. Exhaust gas recirculation is particularly useful in connection with internal combustion engines used in motor vehicles, such as passenger cars, light duty trucks, and other motorized equipment.

Turbochargers are also known to be used in the related art to provide charge air to the working fluid circuit of an engine. More specifically, when a engine is turbocharged, the pressurized exhaust gas acts on a turbine that, in turn, drives a compressor. The compressor pressurizes the intake air for the internal combustion engine making it more dense. Dense intake air improves combustion resulting in increased power from the engine. Turbochargers are employed in connection with both spark ignition and compression ignition (diesel) engines for this purpose.

In addition to recirculating the exhaust gases, it is also known in the related art that lowering intake manifold temperatures reduces the formation of nitrous oxides generated as a product of combustion. However, the exhaust gases that are available for recirculation are generally very hot, sometimes exceeding 550 C. Thus, it is known in the art to cool the recirculated exhaust gas in order to lower the intake air temperature thereby further reducing the production of $NO_x$ where exhaust gas recirculation is employed. In addition, it is also known to cool the charge air delivered by the turbocharger prior to induction into the combustion chamber. The EGR intercooler and charge air cooler are separate heat exchangers that are employed to cool these two engine working fluids. One example of a turbocharged internal combustion engine having intercooled exhaust gas recirculation is found in U.S. Pat. No. 6,116,026, issued Sep. 12, 2000 and assigned to the assignee of the present invention. The disclosure of this patent is incorporated herewith.

In turbocharged internal combustion engines, the exhaust gas to be recirculated is generally removed upstream of the turbine, routed through the intercooler, and then reintroduced into the intake air stream downstream of the compressor and the charge air cooler. Exhaust gas intercoolers of this type often employ engine coolant as the cooling medium. While these coolers have generally worked for their intended purpose in the past, disadvantages still remain. More specifically, using the engine coolant as the cooling medium increases the heat load on the engine cooling system and thereby necessitates larger vehicles radiators. The use of multiple or staged coolers has also been suggested in the prior art, but this only adds to the bulk of the engine and tends to overcomplicate the engine cooling system. Furthermore, the extreme temperature differentials that exist between the exhaust gas and the coolant in the intercooler creates a harsh working environment. Some products of combustion found in the exhaust gas are highly corrosive and can condense at certain operating temperatures within the intercooler. These harsh operating environments and corrosive condensate can cause the liquid to air intercoolers to leak over time.

Accordingly, there is a need in the art for an engine working fluid circuit that is capable of cooling both the recirculated exhaust gas and the charge air without the addition of multiple coolers. Furthermore, there is a need in the art for an engine working fluid circuit that can cool the recirculated exhaust gas and charge air without the disadvantages associated with leaks at the liquid/air cooling interface. Finally, there remains a need in the art for an engine working fluid circuit that employs an overall simpler cooling strategy, eliminates redundant components, and that improves reliability for the overall system.

SUMMARY OF INVENTION AND ADVANTAGES

The present invention overcomes the disadvantages of the related art in working fluid circuit for a turbocharged internal combustion engine that employs exhaust gas recirculation. The working fluid circuit of the present invention includes an exhaust gas passage through which exhaust gas under pressure flows from the internal combustion engine, a charge air passage, and a turbocharger. The turbocharger is operatively driven by the exhaust gas flowing from the internal combustion engine and acts to provide pressurized air to the charge air passage. The engine working fluid circuit further includes an exhaust gas recirculation passage that extends between the exhaust gas passage and the charge air passage, but bypasses the turbocharger. The exhaust gas recirculation passage thereby provides a path for recirculating a predetermined amount of exhaust gas into the charge air passage in such a way that the exhaust gas and the charge air are mixed together. The working fluid circuit further includes an intake passage that provides intake air to the internal combustion engine and a single charge air cooler. The single charge air cooler operatively interconnects and provides fluid communication between the charge air passage and the intake passage. Furthermore, the single charge air cooler acts to cool the mixed charge air and the recirculated exhaust gas prior to induction into the internal combustion engine through the intake passage.

One advantage of the working fluid circuit of the present invention is that it is capable of cooling both the recirculated exhaust gas and the charge air without the addition of multiple coolers. Still another advantage of the present invention is that it can cool the recirculated exhaust gas and charge air without the disadvantages associated with leaks the occur in heat exchangers employing a liquid/air cooling interface. Still another advantage of the present invention is that by mixing the very hot exhaust gas with the much cooler charge air upstream of the charge air cooler, the gas temperature entering the cooler is substantially lower (~300° C. versus >550° C.), thus avoiding the problem of thermal fatigue stress cracking, which has been experienced with separate EGR gas/liquid coolers. Still another advantage of the present invention is that the recirculated exhaust gas is more thoroughly mixed with the charge air by being introduced upstream of the charge air cooler. Furthermore, the working fluid circuit of the present invention employs an overall simpler cooling strategy, eliminates redundant components, and improves the reliability of the overall system.

BRIEF DESCRIPTION OF THE DRAWINGS

Other advantages of the invention will be readily appreciated, as the same becomes better understood by reference to the following detailed description when considered in connection with the accompanying drawings, wherein:

FIGS. 3A–3B are tables presenting data from tests conducted on an engine working fluid circuit that employed a single charge air cooler of the present invention;

FIGS. 4A–4B are tables that present data from tests conducted on an engine working fluid circuit using a standard charge air cooler presently available on the market; and FIGS. 5A–5B are tables presenting data from tests conducted on an engine working fluid circuit that employed another standard charge air cooler that is presently available on the market.

DETAILED DESCRIPTION OF THE PREFERRED EMBODIMENT(S)

Figure 1:
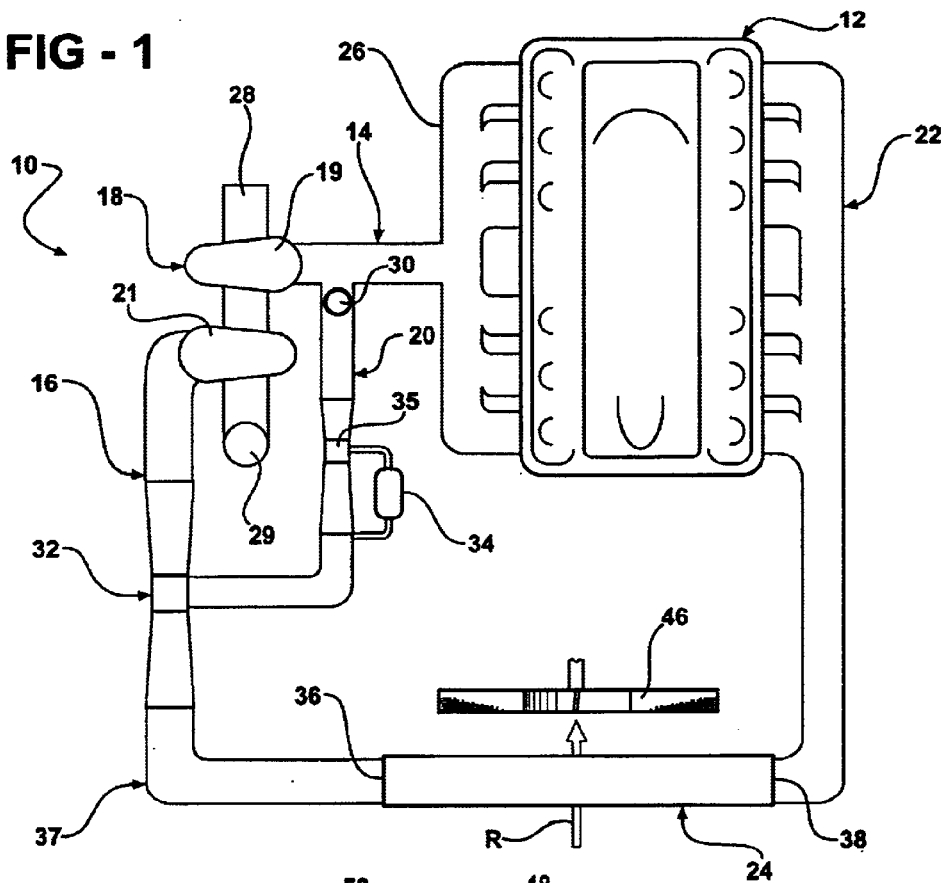
FIG. 1 is a schematic view of the working fluid circuit of the present invention.

Referring now to the figures where like numerals are used to designate like structure throughout the drawings, a working fluid circuit for a turbocharged internal combustion engine that employs exhaust gas recirculation is generally indicated at 10 in FIG. 1. The internal combustion engine is generally indicated at 12 and may include one or more combustion chambers that are arranged in any convenient manner such as inline or in a V-shaped configuration. Thus, the engine working fluid circuit 10 of the present invention may be employed in conjunction with an internal combustion engine having a straight 4, straight 6, V-6, V-8, V-12 cylinder arrangements, or the like. Furthermore, those having ordinary skill in the art will appreciate that the number and particular arrangement of the combustion chambers of the internal combustion engine 12 form no part of the present invention. The internal combustion engine 12 may be either a spark ignition or a compression ignition (diesel) engine. However, in the preferred embodiment contemplated by the inventors herein, the working fluid circuit 10 of the present invention is particularly adapted for use with a diesel engine.

The working fluid circuit 10 includes an exhaust gas passage, generally indicated at 14. The exhaust gas passage is in fluid communication with the combustion chambers of the internal combustion engine 12. Accordingly, exhaust gas under pressure flows from the internal combustion engine 12 through the exhaust gas passage 14. The working fluid circuit 10 further includes a charge air passage, generally indicated at 16, and a turbocharger, generally indicated at 18, that is operatively driven by the exhaust gas flowing from the internal combustion engine 12. The turbocharger 18 acts to provide pressurized air to the charge air passage 16 as will be discussed in greater detail below.

An exhaust gas recirculation passage is generally indicated at 20 and extends between the exhaust gas passage 14 and the charge air passage 16. Furthermore, the exhaust gas recirculation passage 20 bypasses the turbocharger 18 and provides a path for recirculating a predetermined amount of exhaust gas into the charge air passage 16 so as to add mix the exhaust gas and the charge air. The working fluid circuit 10 of the present invention also includes an intake passage 22 that provides intake air to the internal combustion engine 12. In addition, the working fluid circuit 10 includes a single charge air cooler, generally indicated at 24. The single charge air cooler 24 is operatively interconnected to, and provides fluid communication between, the charge air passage 16 and the intake passage 22. The single charge air cooler 24 acts to cool the mixed charge air and recirculated exhaust gas prior to induction into the internal combustion engine 12 through the intake passage 22 as will be described in greater detail below.

In the preferred embodiment, the exhaust gas passage 14 may include an exhaust manifold 26. The exhaust manifold 26 is operatively connected in fluid communication between the combustion chamber(s) of the engine 12 and the turbocharger 18. The turbocharger 18 includes a turbine 19 and a compressor 21 as is commonly known in the art. Pressurized exhaust gas acts on the turbine 19 which, in turn, then drives the compressor 21. The compressor pressurizes intake air supplied to the turbocharger 18 at, for example, 29 to produce pressurized charge air. The charge air is delivered to the charge air passage 16 as noted above. The high pressure exhaust gas used to drive the turbine 19 is vented to the atmosphere as representatively shown at 28.

An exhaust gas recirculation (EGR) valve 30 may be operatively disposed in the exhaust gas recirculation passage 20. The EGR valve 30 acts to control the flow of exhaust gas from the exhaust manifold 26 into the charge air passage 16 but bypassing the turbocharger 18. The EGR valve 30, in turn, is controlled by a central engine controller (not shown) in response to predetermined engine operating parameters.

To promote exhaust gas recirculation, backpressure is sometimes applied at the turbine outlet. A variable nozzle turbine (VNT) turbocharger may be employed for this purpose. In this case, a nozzle or vanes are closed in response to a command from the engine control module. A venturi, generally indicated at 32, may also be used to promote exhaust gas recirculation. The venturi 32 is defined at the fluid connection between the charge air passage 16 and the exhaust gas recirculation passage 20. The venturi 32 assists in drawing flow from the exhaust gas recirculation passage 20 into the charge air passage 16. In addition, a flow measurement sensor 34 may be disposed between the EGR valve 30 and the charge air passage 16 to sense the flow of exhaust gas through the exhaust gas recirculation passage 20. The flow measurement sensor 34 may be of any suitable type, including, for example, (1) of the differential pressure measurement type, employing a venturi and pressure sensor or (2) a hot wire anemometer device to measure air flow.

In the preferred embodiment, the mass air/flow ratio of charge air to recirculated exhaust gas flowing through the charge air passage 16 may be a predetermined value. Thus, in one non-limiting example, the intake air provided from the compressor 21 of the turbocharger 18 may have a mass air/flow of 35 kg/min. at 251° C. On the other hand, the mass air/flow of recirculated exhaust gas maybe 5.8 kg/min. at 594° C. Mixing recirculated exhaust gas with the charge air raises the temperature of the intake air that flows to the combustion chambers through the intake manifold 22 to the internal combustion engine 12. Thus, in this representative example, the mixed charge air and recirculated exhaust gas may have a mass air/flow of 40.8 kg/min. at 312° C. at a point in the charge air passage 16 prior to the single charge air cooler 24, as representatively indicated at 37 in FIG. 1. Accordingly, this mixed charge air and recirculated exhaust gas must be cooled through the single charge air cooler 24.

Figure 2:
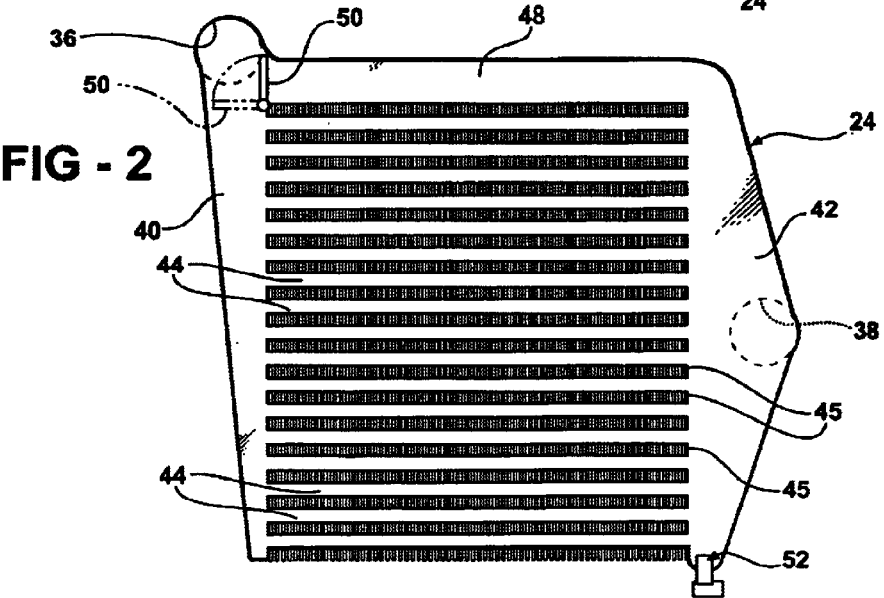
FIG. 2 is a schematic cross-sectional side view of the single charge air cooler of the present invention.

To this end, the single charge air cooler 24 includes an inlet 36 that is operatively connected in fluid communication with the charge air passage 16 and an outlet 38 that is operatively connected in fluid communication with the intake passage 22 for the internal combustion engine 12. As best shown in FIG. 2, the inlet 36 is provided in an inlet manifold 40. Similarly, the outlet 38 is defined in an outlet manifold 42. A plurality of cooling passages 44 extend between the inlet 36 and the outlet 38 of the single charge air cooler 24. More specifically, these cooling passages 44 extend between the inlet manifold 40 and the outlet manifold 42. The cooling passages 44 are spaced from one another so that ram air, generally indicated by the arrow "R" in FIG. 1, may flow over these passages 44 and through cooling fins 45. In addition to this ram air, a fan 46 powered by the internal combustion engine 12 may be employed to draw air across the cooling passages 44. In this way, the cooling passages 44 provide a path for the mixed charge air and recirculated exhaust gas through the single charge air cooler 24 thereby cooling same.

The single charge air cooler 24 further includes at least one bypass passage 48 that extends between the inlet 36 and the outlet 38. A bypass valve 50 is supported within the single charge air cooler 24 and is moveable between an open position, shown in the solid lines, and a closed position, shown in phantom lines, to control the flow of mixed charge air and recirculated exhaust gas between the inlet 36 and the outlet 38 to bypass the cooling passages 44. This bypass feature is advantageous where the temperature of the mixed charge air and recirculated exhaust gas falls within a range that may result in condensation in the single charge air cooler 24. As mentioned above, due to the corrosive content of the exhaust gas, such condensate can lead to corrosion in the cooler where condensation occurs. Thus, the bypass valve 50 is controlled by the central engine controller (not shown) as a function of predetermined operating conditions. Nevertheless, and even in the event of condensation, the single charge air cooler 24 of the present invention may also include a condensation sensor, generally indicated at 52 and located in the representative embodiment a the lower portion of the cooler 24. The sensor 52 is adapted to detect a build up of condensation in the cooler 24.

In the representative example under consideration herein, the mixed charge air and recirculated exhaust gas that enters the single charge air cooler 24 at approximately 312° C., leaves the cooler 24 via the outlet 38 and passes along the intake manifold 22 at approximately 80° C. At this temperature, the air may be pressurized at this point in the engine working fluid circuit at approximately 332 kPa. However, those having ordinary skill in the art will appreciate that the representative temperatures, mass air flow, and pressures discussed herein are merely illustrative and are not meant to place any operational limitations on the present invention.

In this way, the working fluid circuit of the present invention is capable of cooling both the recirculated exhaust gas and the charge air without the addition of multiple coolers. Furthermore, it can cool the recirculated exhaust gas and charge air without the disadvantages associated with leaks that occur in heat exchangers employing a liquid/air cooling interface. Presently, charge air coolers are often manufactured out of aluminum. Those having ordinary skill in the art will recognize that today's typical aluminum charge air coolers are operating at aluminum's thermal fatigue temperature limit of ~250° C. However, aluminum would not likely stand up well to acids known to be present in exhaust gas. For these reasons, stainless steel would likely be the material choice for a single charge air cooler of the present invention cooling mixed charge air and recirculated exhaust gas. It should be noted that stainless steel has a much lower thermal conductivity compared to aluminum (21 W/m-° K versus 173 W/m-° K respectively) and higher weight. Thus stainless steel is often rejected as a material of choice for heat exchangers, especially those used in automotive applications. However, there is space available for a larger charge air cooler in today's typical truck installation, because it is common to place the charge air cooler upstream of the engine coolant radiator, and the coolant radiators generally have larger frontal area than the aluminum charge air coolers. By enlarging the frontal area of the charge air cooler of the present invention to be the same as a typical radiator's frontal area, heat exchanger performance equivalent to today's typical aluminum charge air cooler can be achieved with a single stainless steel charge air cooler flowing mixed charge air and recirculated exhaust gas. This is illustrated in the comparative analysis set forth in FIGS. 3A–3B, 4A–4B, and 5A–5B. FIGS. 3A–3B present data from tests conducted on an engine working fluid circuit that employed a single charge air cooler of the present invention. FIGS. 4A–4B present data taken during similar testing using a standard charge air cooler presently available on the market. Similarly, FIGS. 5A–5B present data from testing of an engine working fluid circuit that employs another charge air cooler that is presently available on the market. The information presented in rectangles in the table of FIGS. 3A–3B highlight that the temperature of the outlet to the single charge air cooler of the present invention is similar to that of the charge air coolers presently available on the market as illustrated in the tables of FIGS. 4A–4B and 5A–5B. More specifically, the tables of FIGS. 3A–3B show that with combined EGR and charge air flow through a stainless steel charge air cooler of the present invention, similar charge air outlet temperature is achieved (with similar pressure drops for both ram air and charge air) as with today's typical aluminum charge air cooler (tables of FIGS. 4A–4B and 5A–5B). The weight increase with the larger stainless steel charge air cooler of the present invention (~26 kg) over today's aluminum charge air cooler (~10 kg) plus a separate EGR gas/liquid cooler and piping (~12 kg) is only about 4 kg. The charge air cooler of the present invention employs a cross flow of ram air to cool the mixed recirculated exhaust gas and charge air in a single pass through the cooler. Thus, the working fluid circuit of the present invention employs an overall simpler cooling strategy, eliminates redundant components, and improves the reliability of the overall system.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

We claim:

1. An engine working fluid circuit for a turbocharged internal combustion engine that employs exhaust gas recirculation, said working fluid circuit comprising:

an exhaust gas passage through which exhaust gas under pressure flows from the internal combustion engine, a charge air passage, and a turbo charger operatively driven by the exhaust gas flowing from the internal combustion engine and acting to provide pressurized air to said charged air passage;

an exhaust gas recirculation passage extending between said exhaust gas passage and said charge air passage bypassing said turbo charger and providing a path for recirculating a predetermined amount of exhaust gas into said charge air passage so as to add mix the exhaust gas with the charge air;

an intake passage for providing intake air to the internal combustion engine;

a single charge air cooler including an inlet operatively connected in fluid communication with said charge air passage and an outlet operatively connected in fluid communication with said intake passage, said single charge air cooler further including a plurality of cooling passages spaced from one another and extending between said inlet and said outlet that may be exposed to a flow of ram air, said plurality of cooling passages thereby operatively interconnecting and providing fluid communication between said charge air passage and said intake passage while providing a cooling path for the mixed charged air and recirculated exhaust gas; and at least one bypass passage extending between said inlet and said outlet of said single charge air cooler separate from said plurality of cooling passages and adapted to provide fluid communication between said inlet and said outlet, said bypass passage having a bypass valve movable between open and closed positions to proportionally control the flow of mixed charge air and recirculated exhaust gas between said cooling passages and said bypass passage.

2. An engine working fluid circuit as set forth in claim 1 wherein said single charge air cooler includes a condensation sensor adapted to detect a build-up of condensation within said cooler.

3. An engine working fluid circuit as set forth in claim 1 further including an exhaust gas recirculation valve operatively disposed in said exhaust gas recirculation passage and acting to control the flow of exhaust gas from said exhaust gas passage into said charge air passage.

4. An engine working fluid circuit as set forth in claim 3 further including a venturi defined at the fluid connection between said charge air passage and said exhaust gas recirculation passage to assist in drawing flow from said exhaust gas recirculation passage into said charge air passage.

5. An engine working fluid circuit as set forth in claim 4 further including a pressure sensor disposed between said exhaust gas recirculation valve and said venturi and adapted to sense the flow of exhaust gas through said exhaust gas recirculation passage.

* * * * *